United States Patent
Lutnick et al.

(10) Patent No.: US 10,176,515 B2
(45) Date of Patent: Jan. 8, 2019

(54) VIRTUAL JEWELRY SHOPPING IN SECONDARY MARKETS

(71) Applicant: Electronic Commodities Exchange, New York, NY (US)

(72) Inventors: Howard Lutnick, New York, NY (US); Simon Tam, Medina, WA (US); Brian Watkins, Seattle, WA (US); Moshe Klein, Monsey, NY (US); Joel Klein, Brooklyn, NY (US); Alex Berg, Seattle, WA (US)

(73) Assignee: ELECTRONIC COMMODITIES EXCHANGE, L.P., White Plains, NY (US)

( * ) Notice: Subject to any disclaimer, the term of this patent is extended or adjusted under 35 U.S.C. 154(b) by 0 days.

(21) Appl. No.: 14/676,809

(22) Filed: Apr. 1, 2015

(65) Prior Publication Data

US 2015/0278891 A1    Oct. 1, 2015

Related U.S. Application Data

(60) Provisional application No. 61/973,643, filed on Apr. 1, 2014.

(51) Int. Cl.
G06Q 30/00 (2012.01)
G06Q 30/06 (2012.01)
G06Q 30/02 (2012.01)

(52) U.S. Cl.
CPC ..... *G06Q 30/0641* (2013.01); *G06Q 30/0278* (2013.01); *G06Q 30/06* (2013.01); *G06Q 30/0601* (2013.01); *G06Q 30/0609* (2013.01); *G06Q 30/0611* (2013.01); *G06Q 30/0613* (2013.01); *G06Q 30/0617* (2013.01); *G06Q 30/0619* (2013.01); *G06Q 30/0623* (2013.01); *G06Q 30/0627* (2013.01); *G06Q 30/0635* (2013.01); *G06Q 30/0639* (2013.01); *G06Q 30/0643* (2013.01)

(58) Field of Classification Search
CPC .......... G06Q 30/06; G06Q 30/0601–30/0645; G06Q 30/08
USPC .............................................. 705/26.1–27.2
See application file for complete search history.

(56) References Cited

U.S. PATENT DOCUMENTS

| | | | |
|---|---|---|---|
| 6,015,167 A | 1/2000 | Savino | |
| 8,073,740 B1 * | 12/2011 | Siegel | G06Q 30/06 705/26.1 |
| 8,095,427 B1 | 1/2012 | Buston | |
| 8,755,824 B1 * | 6/2014 | Wang | H04W 4/021 340/539.13 |
| 2002/0184104 A1 | 12/2002 | Littman | |
| 2003/0204289 A1 | 10/2003 | Banerjee et al. | |

(Continued)

FOREIGN PATENT DOCUMENTS

WO    WO 2013183071 A2 * 12/2013

OTHER PUBLICATIONS

"Find and Compare Glasses on iPad with Ochkari", Nov. 5, 2014, archived on Feb. 6, 2015, TryLive [accessed on Apr. 28, 2018], accessed at [https://web.archive.org/web/20150206082408/http://www.trylive.com:80/news/virtual-tryon-russia-ipad].*

(Continued)

*Primary Examiner* — Resha Desai
*Assistant Examiner* — Lindsey B Smith

(57) ABSTRACT

Methods, systems and apparatus for virtual online jewelry sales in secondary markets.

20 Claims, 8 Drawing Sheets

(56) References Cited

U.S. PATENT DOCUMENTS

| | | |
|---|---|---|
| 2004/0078305 A1 | 4/2004 | Weller |
| 2005/0222918 A1 | 10/2005 | Vanska |
| 2008/0228600 A1 | 9/2008 | Treyz |
| 2010/0030578 A1 | 2/2010 | Siddique |
| 2011/0307349 A1 | 12/2011 | Gandhi |
| 2012/0046958 A1 | 2/2012 | Pynadath et al. |
| 2012/0059729 A1* | 3/2012 | Roa ............... G06Q 30/0601 705/26.1 |
| 2012/0130865 A1 | 5/2012 | Rendler |
| 2012/0158597 A1* | 6/2012 | Malik ............... G06Q 30/016 705/304 |
| 2013/0218714 A1 | 8/2013 | Watkins |
| 2013/0226646 A1 | 8/2013 | Watkins et al. |
| 2013/0230138 A1 | 9/2013 | Jeter et al. |
| 2013/0254006 A1 | 9/2013 | Braun |
| 2013/0304574 A1 | 11/2013 | Thomas |
| 2013/0304609 A1 | 11/2013 | Keonorasak |
| 2014/0052563 A1 | 2/2014 | Watkins |
| 2014/0195377 A1* | 7/2014 | Kraft ............... G06Q 30/0208 705/26.35 |
| 2014/0226000 A1 | 8/2014 | Vilcovsky |
| 2014/0379433 A1* | 12/2014 | Opperman ......... G06Q 30/0206 705/7.35 |
| 2015/0193784 A1 | 7/2015 | Gao |
| 2015/0269591 A1* | 9/2015 | Kontilai ............ G06Q 30/0185 705/4 |
| 2015/0371260 A1 | 12/2015 | Chan |
| 2016/0110787 A1* | 4/2016 | Bibian ............... G06Q 30/0641 705/26.35 |

OTHER PUBLICATIONS

Notification of Concerning Transmittal of International Preliminary Report on Patentability for PCT/US2015/023909; dated Oct. 13, 2016; 5 pages.

EP Extended European Search Report for 10773967.3; dated Jul. 12, 2017; 6 pages.

\* cited by examiner

VIRTUAL JEWELRY SHOPPING IN SECONDARY MARKETS

CROSS-REFERENCE APPLICATIONS

This invention claims priority to U.S. Provisional Appl. 61/973,643, which was filed on Apr. 1, 2014.

FIELD OF INVENTION

This application is generally related to virtual jewelry shopping in secondary markets.

BACKGROUND

The proliferation of on-line shopping has significantly changed the retail landscape. Increasingly, customers are enjoying the convenience, speed and ability to browse in comfort that Internet shopping enables. Descriptions for a system, apparatus and method of virtual jewelry shopping, as well as the design of customized jewelry pieces from a remote location, are described in U.S. application Ser. Nos. 13/837,374; 13/837,495; 13/837,610, all of which are incorporated by reference herein.

Due to the expensive price tag and unique nature of fine jewelry, some customers may be hesitant to purchase luxury jewelry items sight unseen. For example, in purchasing loose diamonds, since no two diamonds are alike, a customer may be especially particular about seeing the actual stone in person. Thus, it may be desirable for online jewelry retailers to partner with local brick-and-mortar stores in order to provide additional features and opportunities for their online retail customers.

Moreover, there is a large secondary market of used jewelry item that also may be sold via a reputable on-line retailer.

DETAILED DESCRIPTION

Figure 1:
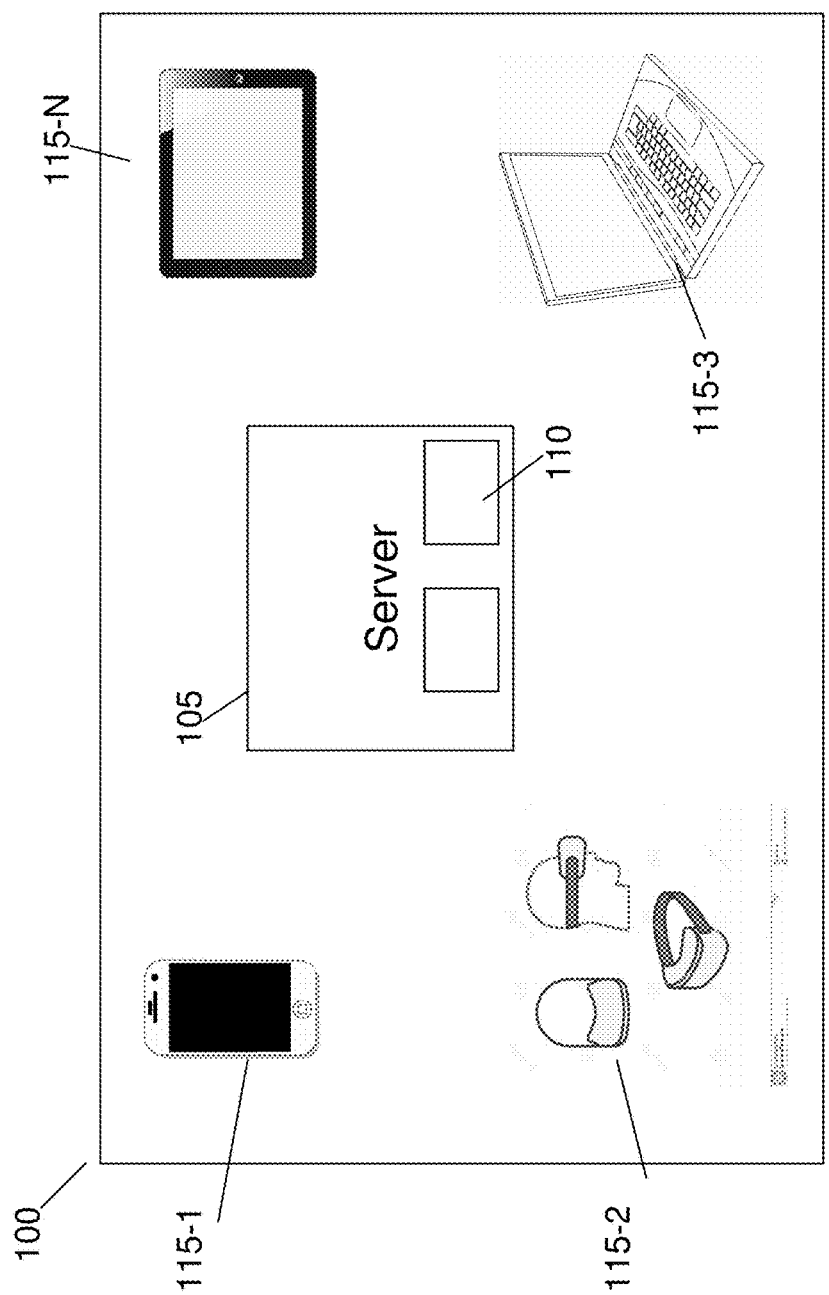
FIG. 1 shows a block diagram of a wireless system for remote shopping of jewelry items.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant, wearable technology (such as VR headsets, smart watches, smart glasses, smart rings), or any other machine adapted for executing programmable instructions in accordance with the description thereof set forth above. The embodiments of the present invention may be facilitated by any one of the electronic devices described above.

FIG. 1 shows a block diagram of a wireless system 100 which may be used to facilitate remote shopping of the jewelry items according to the embodiments of the present invention. The wireless system 100 comprises a server 105, including one or more processors 110 running software, and remote devices 115-1 through 115-N (e.g., smart phones) configured to access said server 105 facilitating the shopping of jewelry items on the remote devices 115-1 through 115-N. In another embodiment, the shopping website according to the embodiments of the present invention may be in the form of a software application ("App") downloadable onto smart phones, tablets, wearable technology or computers and usable via processing power and a user interface associated therewith.

In-Store Preview

Figure 2A:
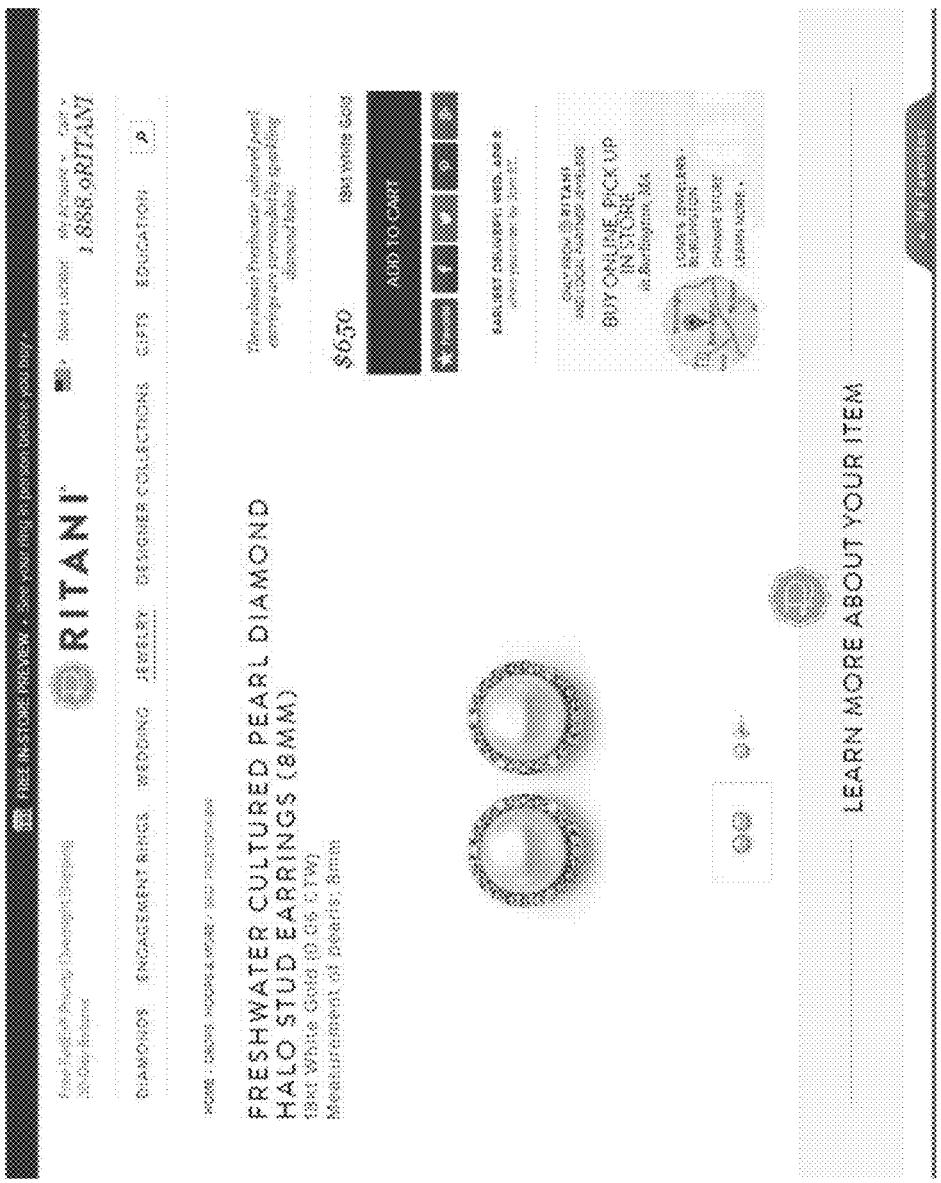
FIG. 2a is a screenshot of a sample website for jewelry shopping
Figure 2B:
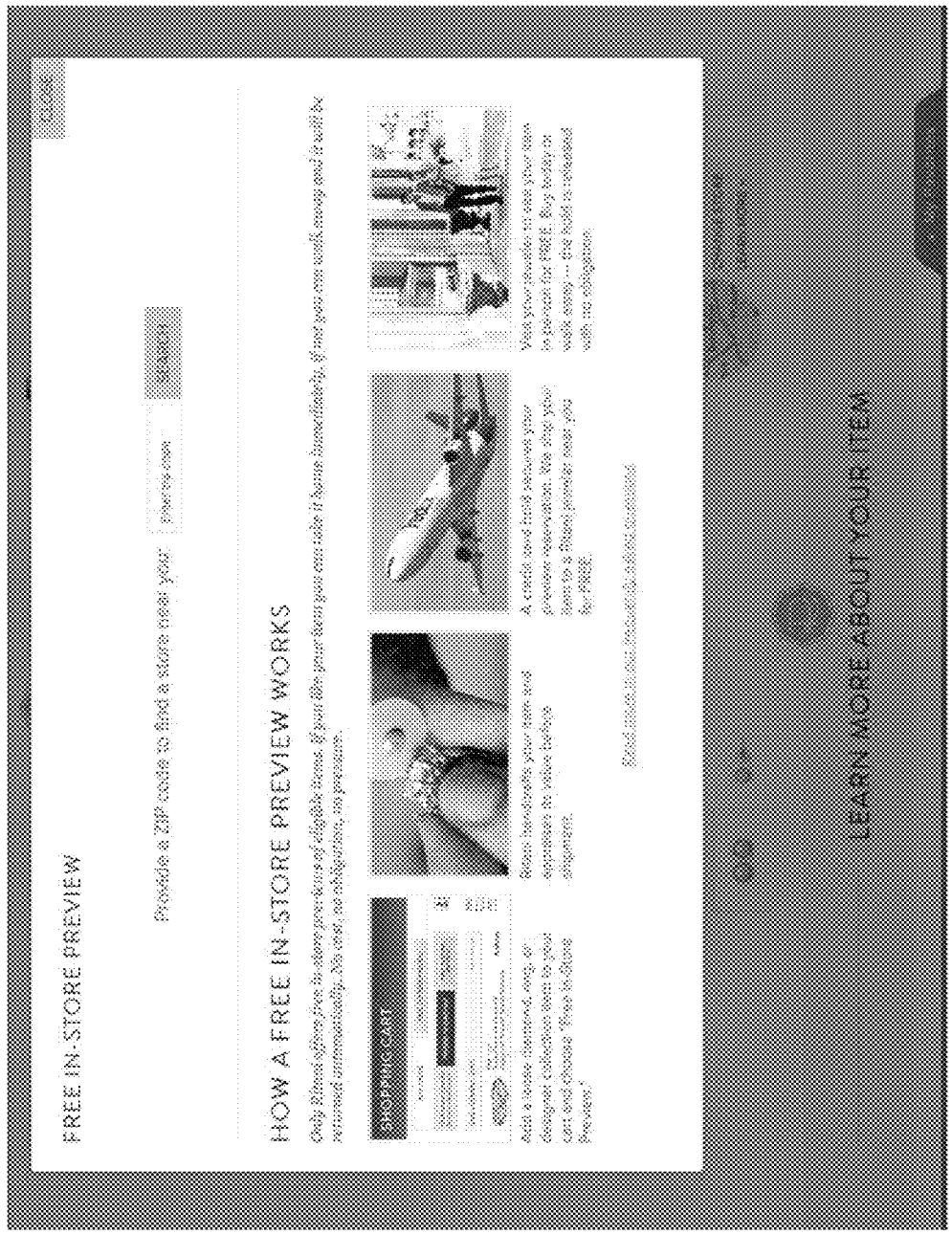
FIG. 2b is a screenshot of a sample website for jewelry shopping
Figure 2C:
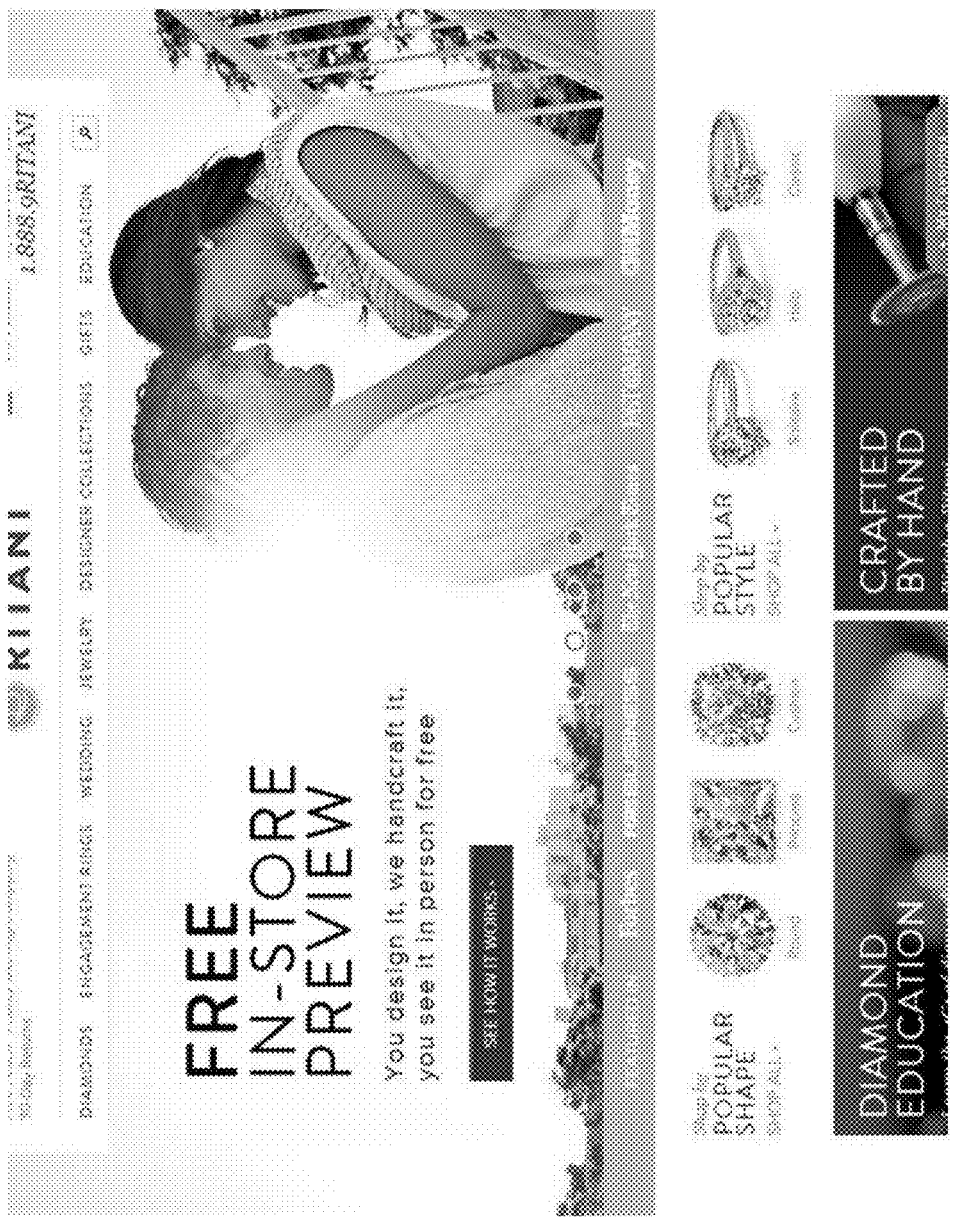
FIG. 2c is a screenshot of a sample website for jewelry shopping

FIGS. 2a-2c are screenshots of an sample website for an on-line jewelry shopping experience.

Figure 3:
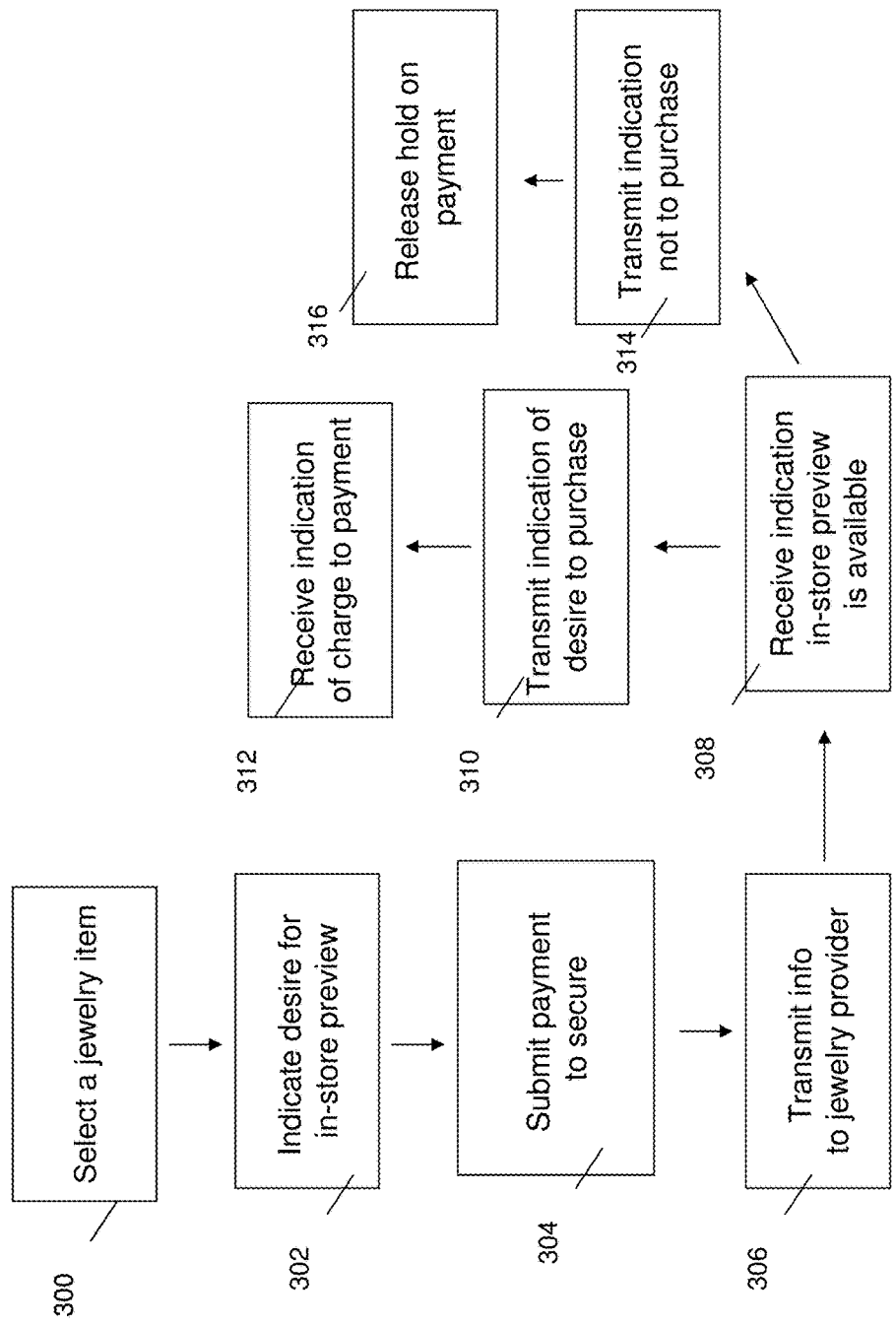
FIG. 3 illustrates a flowchart of the process to request an in-store preview.

FIG. 3 illustrates a flowchart of the process in which a purchase may request an in-store preview of a jewelry item. A customer browsing the jewelry website may select 300 a jewelry item (such as a ring or a loose diamond) that he wishes to purchase and adds the selected jewelry items to the shopping cart. He then indicates 302 a desire for in-store preview. In one embodiment, the website has a button dedicated to "In-Store Preview". In another embodiment, the in-store previous option is available through the selection of a hyperlink. The customer may be prompted to enter his location, such as submitting a city, address and/or zip code, in order to identify the nearest brick-and-mortar partner in the area. The customer may save this or any other store in his profile, which will be remembered for future shopping experiences.

In another embodiment, the customer's location is automatically identified using a GPS locator that is integrated into the customer's electronic device.

The user may be required to requested to submit 304 payment information, such as a credit card, in order to secure the preview reservation. In one embodiment, system 100 transmits the payment to a third party verification server, which verifies the customer's provided payment. Once the customer's payment has been provided and verified, then information regarding the selected jewelry item is transmitted 306 to the jewelry provider who may handicraft or identify the selected jewelry item and then ship the jewelry item to the identified local partner's store.

In one embodiment, the customer receives 308 an indictor that provides a future date and time in which the jewelry item will be available for preview at the local partner's store. There may be a window of time provided, such as a one week period, before the jewelry item is return to the on-line jewelry provider. In one embodiment, the customer may reserve via the website a specific time to meet with an on-site salesperson. In one embodiment, a sales associate at the local partner's store contacts the customer to schedule a preview. In another embodiment, the customer drops in the local partner's store during regular store hours and asks to preview the selected jewelry item.

If the customer wishes to purchase the selected jewelry item, he simply goes home with the jewelry item. The local partner transmits 310 a message to the online jewelry provider indicating the customer's recent purchase of the jewelry item, and the online jewelry provider charges 312 the customer using payment that was provided to secure the in-store preview. The customer may also request to change the form of payment that is used to pay for the selected jewelry item. However, if the customer is no longer interested in the selected jewelry item, then a message indicating their lack of interest is transmitted 314 to system 100, which then releases 316 the hold that is placed on the customer's form of payment.

Figure 4:
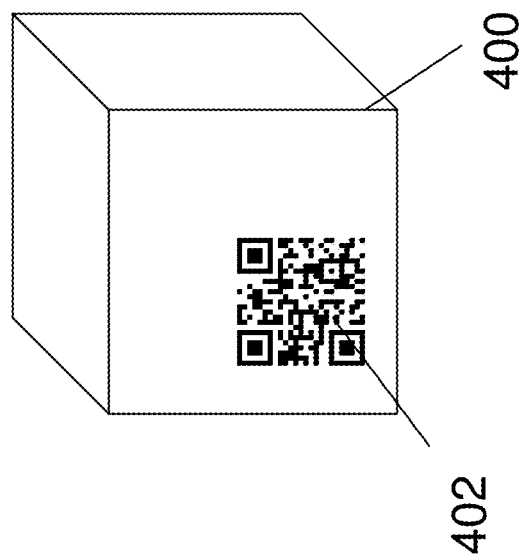
FIG. 4 illustrates an embodiment of a packaging with an identifier.

FIG. 4. illustrates one embodiment of a packaging that is used to ship the selected jewelry item. Package 400 may contain identifier 402. Although the illustrated example shows identifier 402 as a QR (quick response) code, identifier 402 can be represented by any number of formats, such as any number of matrix barcodes (e.g., shot code, qode, high capacity color barcode, visual cryptogram), 1-D barcodes, 3-D barcodes and the like.

Identifier 402 may be embedded with a plurality of information that is relevant to both the jewelry item and the customer.

In one embodiment, identifier 402 is embedded with detailed information about the jewelry item that is being shipped to the local partner. Such information may include specific details about the jewelry item, such as style, brand, weight, color, value, gemstone source. A local partner store would be able to have knowledge about the content inside the shipping package without opening the package. In one embodiment, scanning the identifier automatically inputs the relevant information into the computer system in the store.

In another embodiment, the identifier may be embedded with personal information about the customer who ordered the jewelry item. Such personal information may include the customer's demographics, shopping preferences, recent searches, previous purchases, desired price range, saved searches, and the like.

In traditional in-store shopping experience, a sales associates gets to know a customer while helping him or her try on various jewelry item. Through the course of their conversation and observation of the customer's shopping preferences in the store, the sales associate is able to tailor and suggest jewelry items that are aligned within the customer's interest and budget. By contrast, for a sales associate who is meeting with an online customer who requested in-store preview, she is often meeting the customer for the firs-time during the in-store preview. As such, the embedded personal information may allow the store to further customize the in-store shopping experience for the customer when he enters the retail establishment.

In some embodiments, the information embedded in the identifier may inform the sales associate about shopping habits of the customer. For example, the store may be alerted in advance that the customer has been shopping for diamond engagement rings within the $5000-10,000 price range. As such, the store may attempt to align a sales associate that specializes in diamond engagement rings to meet with the customer. Furthermore, if a sales associates has some prior knowledge of the customer' shopping preferences and recent searches, she might be able to better guide the customer is his selection of a jewelry item. In providing sales associates with detailed insight into the customer, the jewelry provider is able to replicate the in-store shopping experience for its online customer.

In Store Experience

Figure 5:
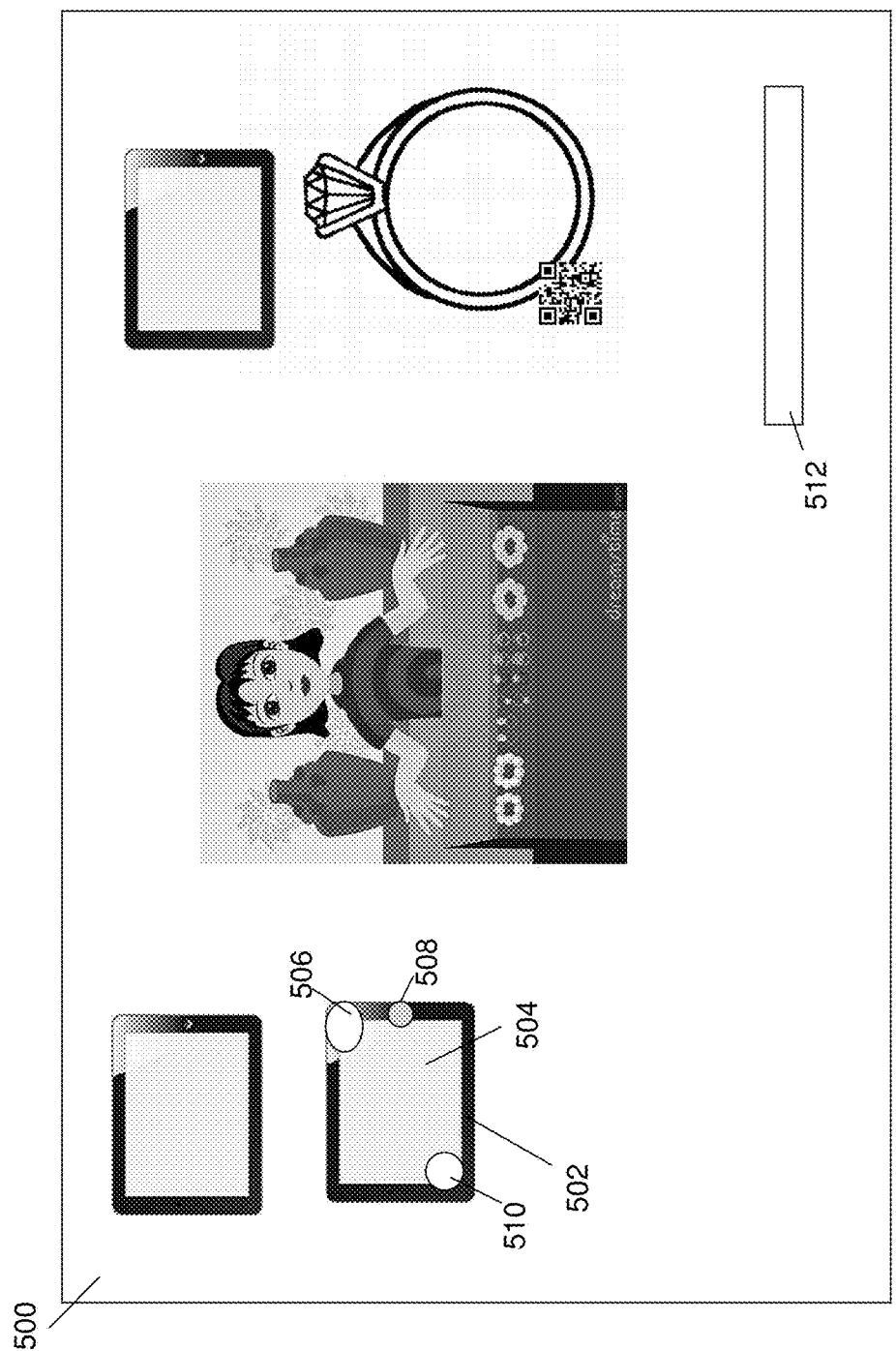
FIG. 5 illustrates an in-store preview experience.

Typically, the local partner is an establish jewelry store, such as Long's Jewelers, that carries its own inventory of jewelry items. The local partner, however, may also have a portion of the store that is dedicated for the in-store preview experience from the online jewelry provider. In some embodiments, the online jewelry provider rents a portion of the local partner's store in order to establish the in-store preview area. FIG. 5 illustrates an example of the set-up of an in-store preview at a store.

As shown in FIG. 5, system 500 illustrates an in-store preview experience that utilize various technology devices. In one embodiment, the in-store preview area contains a number of wireless handheld devices. FIG. 5 shows the handheld device 502 as being a tablet, such as an iPad, but any number of technological devices may be used.

Device 502 may include display 504, which depicts various information about a jewelry item. Device 502 also may include microscope lens 506, which allows the customer to view the jewelry items in detail. Microscope 506 may serve as a personal jewelry loupe for a customer wishing to examine a piece of jewelry up close, such as looking at an inclusion of a diamond.

In some embodiments, device 502 also includes a chip reader 508, such as an RFID reader. Each jewelry item may include a tag which houses a corresponding chip and the like. The chip may contain specific information about the jewelry item, such as its price, gem source, weight, metal type, and the like. A customer using device 502 may wish to independently browse the various items in the store, and if he finds something of interest, he can simply scan the jewelry tag to obtain the relevant information on device 502. For example, the customer may encounter a ruby necklace of interest. Rather than waiting for a sales associate to take the item from the case, he simple places device 502 over the necklace. Device 502 automatically detects a RFID chip located on the tag of the necklace. Information regarding the ruby necklace will automatically be displayed on the customer's device 502.

Device 502 also may include an indicator button 510, which transmits an indication that a customer wishes to be helped with a sales associates in person.

In one embodiment, device 502 keeps track of the customer's shopping preferences while in the store. For example, device 502 may record any jewelry item that the customer scans and stores this information in the customer's profile. Thus, if the customer indicates a desire to speak with a sales associate, she can log into the customer's profile and ascertain a quick previous of the items that the customer has been considering. Device 502 also may store any jewelry pieces that the customer examiners with a sales associate.

In one embodiment, device 502 stores the information without the customer's input. In another embodiment, a customer may use device 502 to store jewelry pieces of interest to a customer profile associated with the online jewelry provider. For example, the customer may narrow his search to three different engagement rings, but not being ready to purchase yet, he may choose to keep a record of his in-store visit and store the information on his customer profile, which he can retrieve at a later time.

Device 502 also may allow the customer to upload the website for the on-line provider. The customer may have the option of comparing the jewelry item that is in the store with other inventory that is available through the online jewelry provider.

In one embodiment, system 500 provides the customer with a low-pressure sales experience, where he may choose whether he wishes to engage with a live sales associate. In another embodiment, system 500 allows a local partner to streamline its resources, so that sales associates are spending time with customers who are more serious about making a purchase. In yet another embodiment, system 500 allows the local partner to reduce its sales staff, since the tablets provide a lot of the initial fielding of questions from customers.

System 400 also may include a remote chip-reader 512, such as a RFID mat, that is remote to device 502 and connected wirelessly. As described above, each jewelry item may include a chip that is embedded on its tag. In one embodiment, when the sales associates passes the jewelry item to the customer, the chip on the jewelry item is automatically detected. The information that is embedded in the chip, such as specific details about the jewelry item, is wirelessly transmitted and shown on display 510 of device 502. The experience for the customer is a seamless transition, in which information about the jewelry item that they are handling automatically displays on device 502. In one embodiment, the customer also may select to save the jewelry item and the relevant information to his customer profile.

Although the embodiments above are described in the context of store-owned devices, in another embodiment, a customer may simply download a corresponding mobile app on to a personal electronic device, such as a smart phone or wearable technology. In one embodiment, the store has a number of attachable microscope lenses 512, which a customer may attach to his personal electronic device. The customer may then take advantage of the in-store shopping experience described above, using his personal electronic device, rather than a store issued device 502.

Compensation

In one embodiment, a local partner receives a monetary benefit from participating in the partnership. The local partner may receive a commission if the shipped jewelry item is purchased on-site. In this set-up, the local partner is compensated for assisting in the sale of another company's product. In another embodiment, the local partner may be rewarded a compensation if the customer purchases the jewelry item from the on-line retail store at a later date.

In another embodiment, compensation to the local partner is not limited to the shipped jewelry item. In one embodiment, the local partner is assigned a territory. Any on-line sales made by individuals within this territory will result in some form of compensation to the local partner. The territory may be defined in any number of ways, such as a certain radius from the local partner's location, a specific state, a specific region, assigned zip codes, etc.

In another embodiment, the local partner may be assigned more than one territory. In one embodiment, the territories are distinct, such as the State of New Jersey and the State of New York. In another embodiment, the various territories may be overlapping, such as the Northeast region, the Commonwealth of Massachusetts, and the city of Boston. In another embodiment, the territories are broken into tiers, which each tier being assigned different compensation structures. In one example, the local partner is assigned three different territory tiers, where Tier 1 territories are within a 5 mile radius of the local partner's location. Any sales made within a Tier 1 territory is more likely a direct result of assistance by the local partner, as such sales within Tier 1 are rewarded the highest amount of commission of 20%. The Tier 2 territory encompasses a 15 mile radius of the local partner's location. These sales are rewarded by a 10% commission. Lastly, the Tier 3 territories are defined as sales made from locations beyond the 15 mi radius of the local partner's location, and as such are rewarded at a 5% commission rate.

In another embodiment, the local partner has a territory that encompasses certain zip codes, such as the billing zip code or the shipping zip code.

In one embodiment, the compensation structure is calculated over a period of time. For example, the compensation may be derived from the total revenue in sale over a quarterly period.

In yet another embodiment, the customer fills out a survey regarding her in-store preview experience with the local partner. The results from this survey may be used in determining the commission received by the local partner.

Augmented Reality

In addition to in-store preview of a jewelry item, system 100 also provides customers with augment reality opportunities. For instance, the customer may be able to superimpose an image of the jewelry item onto herself via a camera device. In one embodiment, the customer is shopping for a jewelry item on a mobile device, such as an iPhone. The mobile device may include a built-in camera. After selecting a jewelry item of interest, such as a ring, the customer may have the option to generate an image overlay of the jewelry item. In one embodiment, system 100 generates an image overlay of the selected jewelry item. The image of the jewelry then appears in the camera viewfinder of the device. Holding the device, the user can match the image overlay onto herself and get a sense of how the jewelry item would look on herself. For example, if the customer is interested in a particular ring, system 100 may generate an image overlay of the ring. The ring image will appear in the camera viewfinder of the customer's device. While holding the camera over her hand, the customer is able to superimpose the ring image over her own hand. In this sense, the customer can get an idea of how the ring might look on her actual hand. For instance, the customer might wish to know how the metal of the band looks against her skin tone, or whether the center stone of the ring looks too gaudy on her hand.

In one embodiment, the customer is provided with a template jewelry item, such as a template ring. The template ring maybe color-coded in order to help facilitate the superimposing process. For example, the customer may be provided with a blue ring that she can wear as a jewelry template. The customer then downloads an app on her mobile device that corresponds to the augmented reality service. In one embodiment, the system receives an indication that the customer is interested in superimposing a selected jewelry item on herself. System 100 then detects the color-code of the template jewelry item and filters out all other images, except for the template. System 100 then overlays an image of the jewelry item on top of the template.

In one embodiment, system 100 receives feedback from the customer about the superimposed image. In one embodiment, the system includes sensitivity indicators, which the customers may adjust to provide the optimal image. For example, if the customer is holding her hand against the sky, the system may be adjusted to be more sensitive, so that it can distinguish between the blue color in the jewelry item template versus the blue color of the sky.

In another embodiment, system 100 may receive feedback from the customer to further resize the superimposed image so that it appears to be a closer fit on the customer.

In one embodiment, system 100 requires the user to include a benchmark item, such as a coin, in the viewfinder, so that system 100 is able to size the image overlay in proper proportions.

In another embodiment, system 100 is capable of detecting the customer's hand and generating a recommendation of the ring sense or a proper length of a necklace.

Secondary Markets

As described thus far, system 100 has been used mainly in the sale of custom-designed or new inventory. However, system 100 also may be used in the sale of secondary market jewelry items. Again, consumer confidence in the online jewelry provider is paramount in the sale of secondary market jewelry items. Thus, it becomes necessary for system 100 to offer a verification system that verifies the authenticity of the secondary market items that are being sold.

In one embodiment, the on-line retailer may serve as an on-line consignment shop that sells jewelry items on behalf of customers. The on-line retailer takes a portion of the sales proceeds, similar to that of consignment shops.

In another embodiment, the on-line retailer purchases the jewelry item directly from the customer. The on-line retailer may either sell the jewelry item in its original form, or it may choose to recycle the jewelry item, such as melting down the metal and re-setting the stones.

Figure 6:
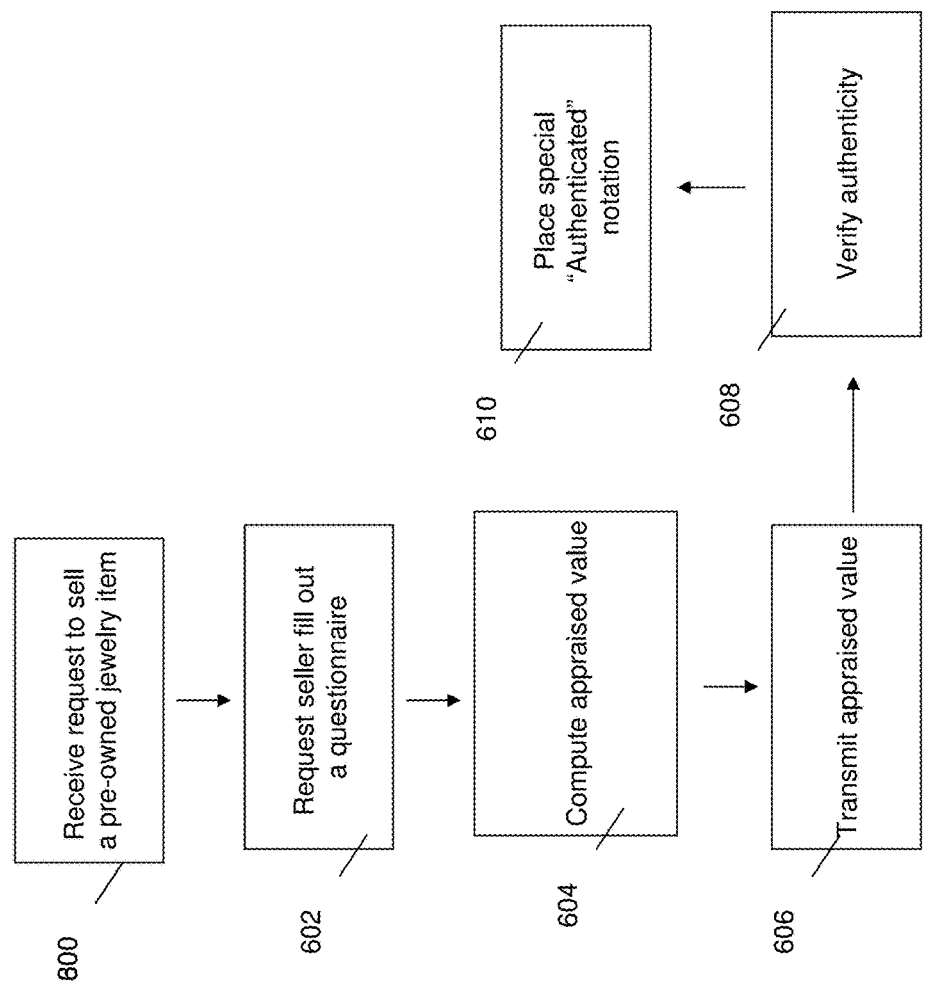
FIG. 6 illustrates a flowchart of the sale of secondary market jewelry items.

FIG. 6 shows a flowchart of a secondary market sales process. In one embodiment, system 100 receives 600 a request from a potential seller, in which the request indicates a desire to sell a previously owned jewelry item. System 100 may request 602 that the seller fill out a detailed questionnaire which describes relevant information pertaining to the pre-owned jewelry item. Such information may include the purchased value, purchased source, description of the item, insured value, age of the jewelry item, and the like. Customer also may be able to upload images of the jewelry item.

System 100 then computes 604 an appraisal of the jewelry item and transmits 606 the appraised value to the seller. The appraisal may be conducted in any number of ways. In one embodiment, the customer goes to the location of a local partner and requests an in-person appraisal from a qualified sales associate. While at the location of the local provider, the customer may have the option of directly selling the jewelry item for the appraised value. In one embodiment, the customer receives an amount equates to the appraised value minus a transaction fee.

In another embodiment, the customer does not wish to sell the jewelry item to the local provider, but instead the customer desires to sell the jewelry item online via the online jewelry provider's website. The customer may have the option to store the jewelry item in a secured location at the local partners store. The local partner may or may not charge an additional storage fee for this service.

In another embodiment, the customer interacts with the online jewelry provider directly. In this instance, the customer mails the jewelry item to a virtual gemologist for appraisal. After system 100 has verified 608 the authenticity of the jewelry item, the on-line retailer may place 610 a special indication, such as "Authenticated", next to the jewelry item on its website. This special indication provides potential buyers with confidence in purchasing used jewelry items.

In yet another embodiment, the customer may opt to sell the jewelry item without verification by a virtual gemologist. Such item may still be listed by the on-line retailer, but they will not include the "Authenticated" indication. In another embodiment, the customer may wish to sell the jewelry item immediately to the on-line retailer without authentication. Due to the risk being undertaken by the on-line retailer, the amount paid will be considerably less, than after verification of the jewelry item. This method may be desirable for customers who are in need of money quickly.

In yet another embodiment, system 100 allows potential customers to apply the amount of their old jewelry item towards a new purchase. In one embodiment, customers are provided a greater credit for trading in jewelry items that were previously purchased through the on-line retailer. In another embodiment, the customer receives a higher value if she selects to receive credit instead of cash for the sale of her jewelry item.

INCORPORATION BY REFERENCE

The following applications are incorporated by reference herein:

U.S. application Ser. No. 13/248,257 (U.S. Pat. No. 8,626, 601), issued on Jan. 7, 2014;
U.S. application Ser. No. 13/826,517 (U.S. Publication No. 20130204736), filed on Mar. 14, 2013;
U.S. application Ser. No. 14/148,592 (U.S. Publication No. 20140188662), filed on Jan. 6, 2014;
U.S. application Ser. No. 13/837,374 (U.S. Publication No. 20130218714), filed on Mar. 15, 2013;
U.S. application Ser. No. 13/837,495 (U.S. Publication No. 20140052563), filed on Mar. 15, 2013;
U.S. application Ser. No. 13/837,610 (U.S. Publication No. 20130208085), filed on Mar. 15, 2013;
U.S. application Ser. No. 13/837,718 (U.S. Publication No. 20130226646), filed on Mar. 15, 2013;

What is claimed:

1. A method for communication between an interface of a computing device of a broker and an interface of a computing device of a user and a remote computing device of a other user for secondary sale of a jewelry item, the method comprising:

receiving, by at least one processor of at least one computer, from an interface of a computing device of the user, an indication of a desire to sell a previously owned jewelry item;

receiving, by the at least one processor of the at least one computer, from the interface of the computing device of the user, information regarding the previously owned jewelry item;

transmitting by the at least one processor of the at least one computer, an appraised purchase price determined for the previously owned jewelry item based on an appraisal conducted for the previously owned jewelry item;

receiving, by the at least one processor of the at least one computer from the interface of the computing device of the user, an indication of a desire to sell the previously owned jewelry item at the appraised purchase price;

responsive to receiving the indication of a desire to sell the previously owned jewelry item at the appraised purchase price, generating by the at least one processor of the at least one computer, authentication indication comprising authenticity data generated based on verification information from an interface of a computing device of a verification system, the authentication indication comprising an offer to sell the previously owned jewelry item;

responsive to receiving the indication of a desire to sell the previously owned jewelry item, causing, by the at least one processor of the at least one computer, the authentication indication to be displayed on an interface of an online jewelry website at the appraised purchase price;

receiving by the at least one processor of the at least one computer from an interface of a remote computing device of the other user, a request to purchase the previously owned jewelry item at the appraised purchase price;

responsive to receiving the request to purchase the previously owned jewelry item, causing, by the at least one processor of the at least one computer, a transaction for a sale of the previously owned jewelry item to be executed at the appraised purchase price;

identifying, by the at least one processor of the at least one computer, at least one local partner location located within a predetermined radius of a location determined from a global positioning system (GPS) locator of the remote computing device of the other user to allow the other user to request an in-person appraisal for the previously owned jewelry item;

extracting, by the at least one processor of the at least one computer, from an identifier associated with shipment of the previously owned jewelry item to the identified at least one local partner location, data representing information regarding a request to view the previously owned jewelry item;

providing, by the at least one processor of the at least one computer, to a computer associated with the identified at least one local partner location, the data representing information regarding a request to view the previously owned jewelry item;

generating, by the at least one processor of the at least one computer, a user interface comprising an image overlay of the previously owned jewelry item and sensitivity indicators, wherein the sensitivity indicators allow the other user to adjust an image of the image overlay on a display of the remote computing device of the other user in order to provide an optimal image;

communicating, by the at least one processor of the at least one computer, the user interface comprising the image overlay and the sensitivity indicators to the remote computing device of the other user; and receiving, by the at least one processor of the at least one computer, sensitivity feedback associated with the sensitivity indicators from the remote computing device of the other user which changes the appearance of the image of the image overlay and provides the optimal image.

2. The method of claim 1, in which the remote computing device comprises a global positioning system (GPS) locator.

3. The method of claim 2, further comprising:
determining a location of a customer using the GPS locator on the remote computing device.

4. The method of claim 3, further comprising:
identifying at least one local partner location located within a predetermined radius of the determined location of the remote computing device.

5. The method of claim 4, further comprising:
transmitting, by the at least one processor, an indication that the previously owned jewelry item will be shipped to the at least one local partner location.

6. The method of claim 4, further comprising:
receiving a request, from the remote computing device, for a meeting with a sales representative located at the at least one local partner location.

7. The method of claim 1, in which the authentication indication comprises a photograph of the previously owned jewelry item.

8. The method of claim 1, in which the authentication indication comprises a description of the previously owned jewelry item.

9. An apparatus for communication for between an interface of a computing device of a broker and an interface of a computing device of a user and a remote computing device of a other user for secondary sale of a jewelry item, the apparatus comprising:

at least one processor of at least one computer;
at least one memory having instructions stored thereon which, when executed by the at least one processor, direct the at least one processor to:
receive, from an interface of a computing device of the user, an indication of a desire to sell a previously owned jewelry item;
receive, from the interface of the computing device of the user, information regarding the previously owned jewelry item;
transmit an appraised purchase price determined for the previously owned jewelry item based on an appraisal conducted for the previously owned jewelry item;

receive, from the interface of the computing device of the user, an indication of a desire to sell the previously owned jewelry item at the appraised purchase price;

responsive to receiving the indication of a desire to sell the previously owned jewelry item at the appraised purchase price, generate authentication indication comprising authenticity data generated based on verification information from an interface of a computing device of a verification system, the authentication indication comprising an offer to sell the previously owned jewelry item;

responsive to receiving the indication of a desire to sell the previously owned jewelry item, cause the authentication indication to be displayed on an interface of an online jewelry website at the appraised purchase price;

receive, from an interface of a remote computing device of the other user, a request to purchase the previously owned jewelry item at the appraised purchase price;

responsive to receiving the request to purchase the previously owned jewelry item, cause a transaction for a sale of the previously owned jewelry item to be executed at the appraised purchase price;

identify at least one local partner location located within a predetermined radius of a location determined from a global positioning system (GPS) locator of the remote computing device of the other user to allow the user to request an in-person appraisal for the previously owned jewelry item;

extract, from an identifier associated with shipment of the previously owned jewelry item to the identified local partner location, data representing information regarding a request to view the previously owned jewelry;

provide to a computer, associated with the identified local partner location, the data representing information regarding a request to view the previously owned jewelry item;

generate a user interface comprising an image overlay of the previously owned jewelry item and sensitivity indicators, wherein the sensitivity indicators allow the other user to adjust an image of the image overlay on a display of the remote computing device of the other user in order to provide an optimal image;

communicate the user interface comprising the image overlay and the sensitivity indicators to the remote computing device of the other user; and receive sensitivity feedback associated with the sensitivity indicators from the remote computing device of the other user which changes the appearance of the image of the image overlay and provides the optimal image.

10. The apparatus of claim 9, in which the remote computing device comprises a global positioning system (GPS) locator.

11. The apparatus of claim 10, in which the instructions, when executed by the at least one processor, further direct the at least one processor to:
determine a location of a customer using the GPS locator on the remote computing device.

12. The apparatus of claim 11, in which the instructions, when executed by the at least one processor, further direct the at least one processor to:

identify at least one local partner location located within a predetermined radius of the determined location of the customer.

13. The apparatus of claim 12, in which the instructions, when executed by the at least one processor, further direct the at least one processor to:
transmit, by the at least one processor, an indication that the previously owned jewelry item will be shipped to the at least one local partner location.

14. The apparatus of claim 12, in which the instructions, when executed by the at least one processor, further direct the at least one processor to:
receive a request for a meeting with a sales representative located at the at least one local partner location.

15. The apparatus of claim 9, in which the authentication indication comprises a photograph of the previously owned jewelry item.

16. The apparatus of claim 9, in which the authentication indication comprises a description of the previously owned jewelry item.

17. A non-transitory machine-readable medium having instructions stored thereon for communication for between an interface of a computing device of a broker and an interface of a computing device of a user and an interface of a remote computing device of a other user for secondary sale of a jewelry item, the instructions which, when executed by at least one processor of at least one computer, direct the at least one processor to:
receive, from an interface of a computing device of the user, an indication of a desire to sell a previously owned jewelry item;
receive, from the interface of the computing device of the user, information regarding the previously owned jewelry item;
transmit an appraised purchase price determined for the previously owned jewelry item based on an appraisal conducted for the previously owned jewelry item;
receive, from an interface of a computing device of the user, an indication of a desire to sell the previously owned jewelry item at the appraised purchase price;
responsive to receiving the indication of a desire to sell the previously owned jewelry item at the appraised purchase price, generate authentication indication comprising authenticity data generated based verification information from an interface of a computing device of a verification system, the authentication indication comprising an offer to sell the previously owned jewelry item;
responsive to receiving the indication of a desire to sell the previously owned jewelry item, cause the authentication indication to be displayed on an online jewelry website at the appraised purchase price;
receive, from an interface of the remote computing device of the other user, a request to purchase the previously owned jewelry item at the appraised purchase price;
responsive to receiving the request to purchase the previously owned jewelry item, cause a transaction for a sale of the previously owned jewelry item to be executed at the appraised purchase price;
identify at least one local store located within a predetermined radius of a location determined from a global positioning system (GPS) locator of the remote computing device of the other user to allow the other user to request an in-person appraisal for the previously owned jewelry item;
extract, from an identifier associated with shipment of the previously owned jewelry item to a local partner location, data representing information regarding a request to view the previously owned jewelry item;
provide a computer, associated with the local partner location, with the data representing information regarding a request to view the previously owned jewelry item;
generate a user interface comprising an image overlay of the previously owned jewelry item and sensitivity indicators, wherein the sensitivity indicators allow the other user to adjust an image of the image overlay on a display of the remote computing device of the other user in order to provide an optimal image;
communicate the user interface comprising the image overlay and the sensitivity indicators to the remote computing device of the other user; and
receive sensitivity feedback associated with the sensitivity indicators from the remote computing device of the other user which changes the appearance of the image of the image overlay and provides the optimal image.

18. The non-transitory machine-readable medium of claim 17,
in which the remote device comprises a global positioning system (GPS) locator, and
in which the instructions, when executed by the at least one processor, further direct the at least one processor to:
determine a location of a customer using the GPS locator on the remote computing device.

19. The non-transitory machine-readable medium of claim 18, in which the instructions, when executed by the at least one processor, further direct the at least one processor to:
identify at least one local partner location located within a predetermined radius of the determined location of the customer.

20. The non-transitory machine-readable medium of claim 19, in which the instructions, when executed by the at least one processor, further direct the at least one processor to:
transmit, by the at least one processor, an indication that the previously owned jewelry item will be shipped to the at least one local partner location.

* * * * *